(12) United States Patent
Parisi et al.

(10) Patent No.: US 8,858,001 B2
(45) Date of Patent: Oct. 14, 2014

(54) FOGLESS MIRROR

(75) Inventors: Steven Parisi, Haverstraw, NY (US); Gary Parisi, Congers, NY (US); Paul Parisi, San Diego, CA (US)

(73) Assignee: Toilettree Products, Inc., Upper Nyack, NY (US)

( * ) Notice: Subject to any disclaimer, the term of this patent is extended or adjusted under 35 U.S.C. 154(b) by 556 days.

(21) Appl. No.: 12/939,446

(22) Filed: Nov. 4, 2010

(65) Prior Publication Data

US 2011/0170191 A1 Jul. 14, 2011

Related U.S. Application Data

(63) Continuation-in-part of application No. 29/364,453, filed on Jun. 23, 2010, now Pat. No. Des. 640,735, which is a continuation of application No. 29/353,432, filed on Jan. 8, 2010, now Pat. No. Des. 628,410.

(51) Int. Cl.
  *B60R 1/06* (2006.01)
  *A45D 42/08* (2006.01)
  *G02B 27/00* (2006.01)

(52) U.S. Cl.
  CPC ............ *G02B 27/0006* (2013.01); *A45D 42/08* (2013.01)
  USPC .......................................... 359/509; 359/882

(58) Field of Classification Search
  None
  See application file for complete search history.

(56) References Cited

U.S. PATENT DOCUMENTS

| | | |
|---|---|---|
| D152,618 S | 2/1949 | Kibler |
| D186,064 S | 9/1959 | Wise |
| 3,708,218 A | 1/1973 | Smillie, III |
| 4,076,374 A | 2/1978 | Schwab |
| 4,150,869 A | 4/1979 | Hansen |
| D258,474 S | 3/1981 | Edstrom |
| D258,475 S | 3/1981 | Edstrom |
| 4,327,961 A | 5/1982 | Kladitis |
| D280,574 S | 9/1985 | Kladitis |
| D280,872 S | 10/1985 | Johnson |
| 4,556,298 A | 12/1985 | Gottlieb |
| 4,558,929 A | 12/1985 | Stephens et al. |
| D282,993 S | 3/1986 | Sanford |
| 4,655,559 A | 4/1987 | Odell |
| 4,832,475 A | 5/1989 | Daniels |
| 4,836,668 A | 6/1989 | Christianson |
| 4,904,072 A | 2/1990 | Christianson |
| D324,463 S | 3/1992 | Young |
| D339,574 S | 9/1993 | Althans et al. |
| 5,313,316 A | 5/1994 | Davidge |
| D349,489 S | 8/1994 | Wang |
| D356,552 S | 3/1995 | Maeno et al. |
| 5,416,635 A | 5/1995 | Christianson et al. |
| D362,772 S | 10/1995 | Peart et al. |
| D369,049 S | 4/1996 | Scaglione |
| 5,604,633 A | 2/1997 | Christianson |
| 5,623,955 A * | 4/1997 | Sewell ........................... 132/291 |

(Continued)

OTHER PUBLICATIONS http://www.shavenow.com/categories/Fog-Free-Shower-Mirror?gclid=CNTb1Myy1Z4CFdA65QodFRg-rw as downloaded from the Internet on Jan. 8, 2010.

*Primary Examiner* — Jennifer L. Doak

(74) *Attorney, Agent, or Firm* — Myers Wolin, LLC

(57) ABSTRACT

In one embodiment, a mirror comprising a squeegee and a slot for receiving the squeegee blade is used in steamy environments. The mirror may include a reservoir to be filled with hot water to prevent the mirror from fogging.

19 Claims, 9 Drawing Sheets

(56) References Cited

U.S. PATENT DOCUMENTS

| | | |
|---|---|---|
| D391,933 S | 3/1998 | Chang |
| 5,847,873 A | 12/1998 | Kim |
| 5,953,157 A | 9/1999 | Christianson |
| D462,216 S | 9/2002 | Jablonski |
| D464,646 S | 10/2002 | Lin |
| D478,051 S | 8/2003 | Sagawa |
| D486,962 S | 2/2004 | Snell |
| D505,555 S | 5/2005 | Snell |
| D506,877 S | 7/2005 | Snell |
| D531,631 S | 11/2006 | Andre et al. |
| D532,207 S | 11/2006 | Snell |
| D541,563 S | 5/2007 | LaBonia, Jr. et al. |
| D541,799 S | 5/2007 | Andre et al. |
| 7,249,858 B2 | 7/2007 | Blackwood |
| D558,985 S | 1/2008 | Defenbaugh et al. |
| D580,392 S | 11/2008 | Kim et al. |
| D600,242 S | 9/2009 | Yeh et al. |
| D635,556 S | 4/2011 | Suzuki |
| 2001/0020621 A1* | 9/2001 | Immerman et al. ........... 220/483 |
| 2003/0063059 A1 | 4/2003 | Farrow et al. |
| 2003/0235029 A1 | 12/2003 | Doherty et al. |
| 2009/0106928 A1* | 4/2009 | Lee ........................ 15/250.361 |

* cited by examiner

FOGLESS MIRROR

CROSS-REFERENCE TO RELATED APPLICATIONS

This is a continuation-in-part of U.S. application Ser. No. 29/364,453, filed Jun. 23, 2010, which is a continuation of U.S. application Ser. No. 29/353,432, filed Jan. 8, 2010, the contents of each being incorporated herein by reference.

FIELD OF THE INVENTION

This invention relates generally to a mirror, and more specifically to a fog-free mirror for use in steamy environments such as, for example, a bathroom.

BACKGROUND

It is known to place a reservoir behind a mirror and fill it with hot water to keep the mirror fog free in a steamy environment such as a bathroom, shower, locker room or the like. Typically, fog-free mirrors are used in the shower to help with exfoliating, shaving and other grooming needs. However, as with glass shower doors, it is often desirable to clean the mirror, and users have tended to use their hands to swipe the mirror of any residual water droplets and other condensation during or after use. A user's hand is not as smooth or sharp as a squeegee, for example, and often the user's hand tends to just smear and not remove the surface water from the mirror.

Furthermore, fog-free mirrors are often used by multiple users, such as a husband and wife, multiple siblings, gym members, etc. Such users tend to be different heights, and this often results in an adjustment of the positioning of the mirror. With mirrors that are positioned using suction cups and the like, the constant re-positioning can reduce the effectiveness of the suction cup, especially since the most effective attachment is on a perfectly clean surface.

There is a need, therefore, to provide a fog-free mirror that can be effectively cleaned during or after use and re-positioned without disturbing the integrity of the attachment of the mirror to a support surface.

SUMMARY

One embodiment of the present invention comprises a mirror assembly that is positionable for multiple users and includes a squeegee for cleaning the mirror after use.

DETAILED DESCRIPTION OF THE PREFERRED EMBODIMENTS

Figure 1:
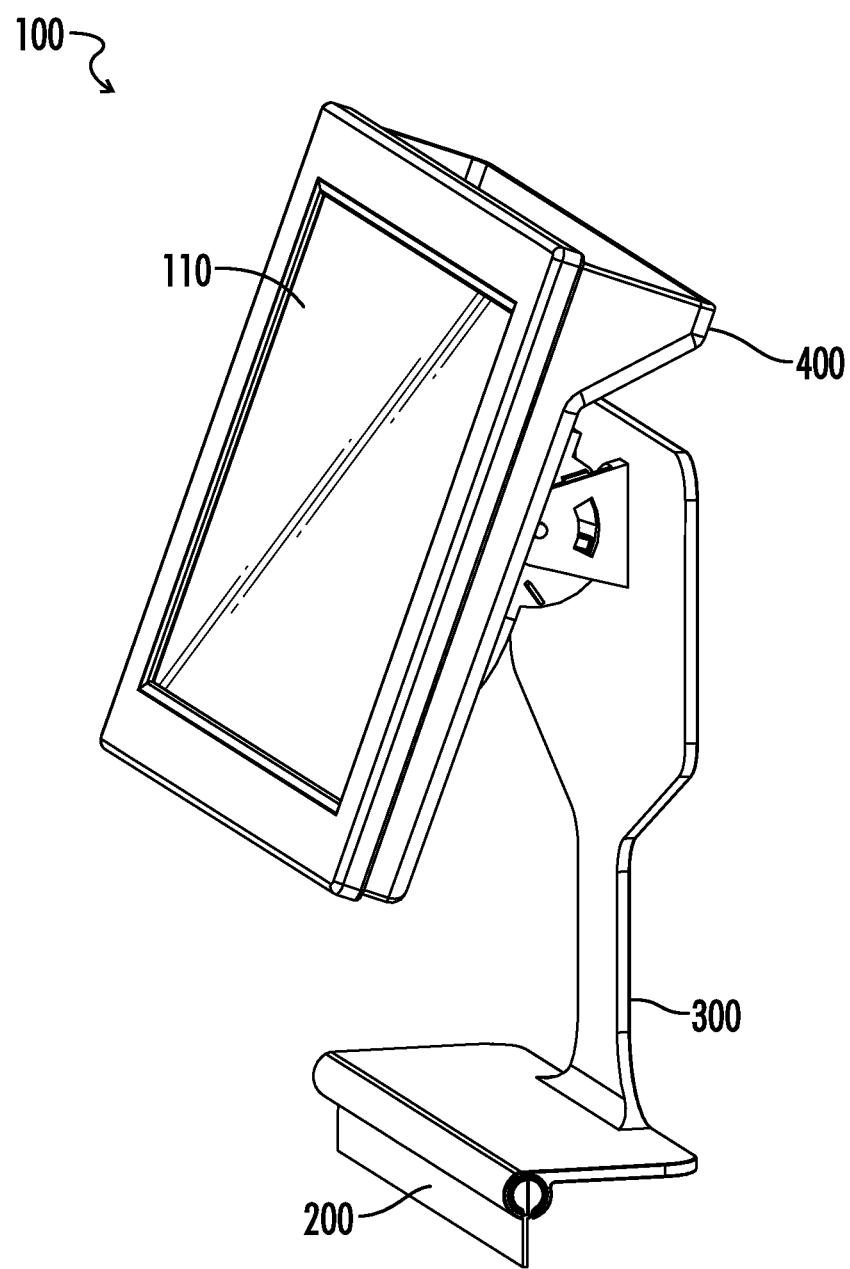
FIG. 1 illustrates one embodiment of a mirror assembly incorporating aspects of the invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates certain aspects of one embodiment of a mirror assembly 100 having a squeegee 200, a base 300 and a reservoir 400 having a chamber 410. The mirror assembly 100 further comprises a reflective surface or mirror 110, a rear surface 115, and a gasket 120 sandwiched between a frame 130 and the reservoir 400 to maintain a waterproof seal between the rear surface 115 of the mirror and the reservoir chamber 410. A portion or the entire mirror 110 may be magnified (not shown) if desired, and a portion or the entire frame 130 may be illuminated (not shown) for use in poorly lit environments. The squeegee 200 may be used for wiping moisture (not shown) off of the mirror 110 and further comprises a handle 210 and a blade 220 extending from the handle 210. The squeegee handle 210 may be made from plastic, for example, while the blade 220 may be made from a flexible material such as rubber. Other materials are possible. The reservoir chamber 410 abuts the rear surface 115 of the mirror such that when the reservoir chamber 410 is filled with hot water, it neutralizes the mirror 110 and air temperature to inhibit fogging on the surface mirror 110 in steamy environments. The opening 415 of the chamber 410 is preferably wider than the floor 430 of the chamber 410 to make it easier to fill the chamber 410 with water. However, it is also preferable to minimize the volume of the chamber 410 to reduce weight of the mirror assembly 100 when filled, and therefore the majority of the chamber 410 is not as wide as the opening 415.

Figure 8:
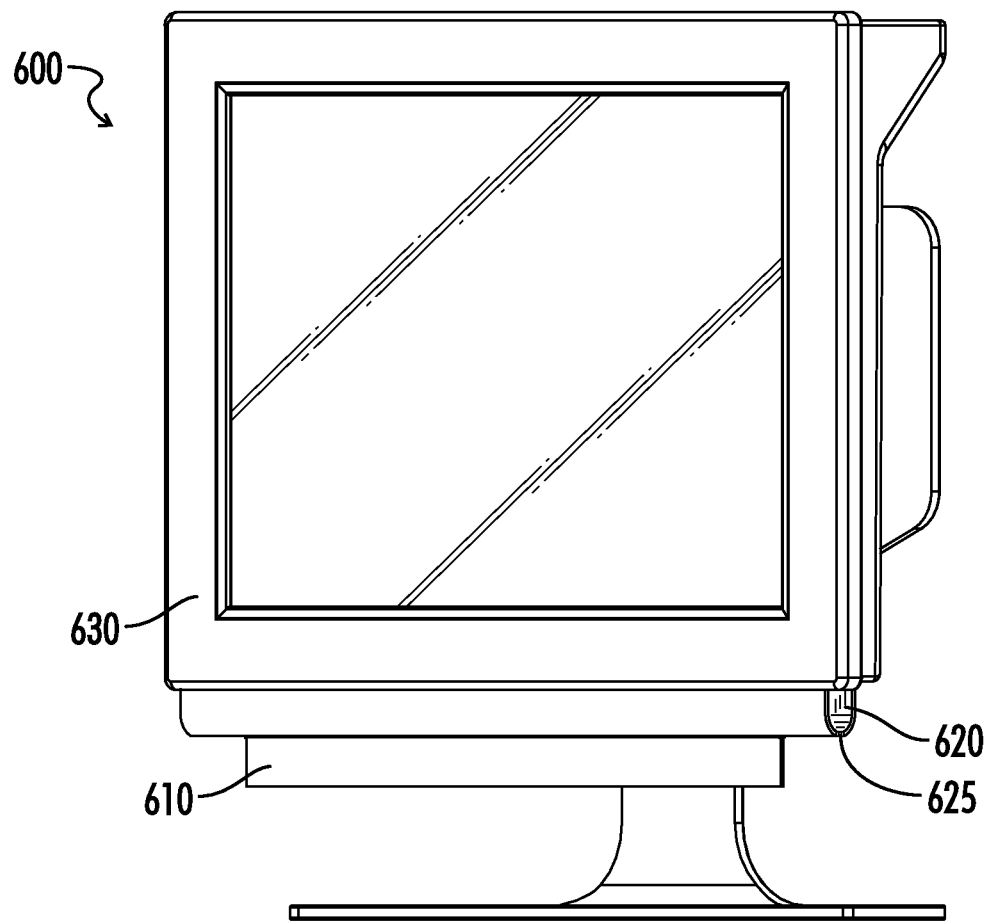
FIG. 8 illustrates an alternative embodiment of a mirror assembly.

In one embodiment, the base 300 is provided with a slot 325 for receiving the squeegee blade 220. The slot 325 enables the mirror 100 to store the squeegee 200 to prevent the squeegee 200 from being separated from the mirror 100 when not in use. The slot 325 may be integral with a chamber 320 for holding the squeegee handle 210. The chamber 320 provides an additional measure to secure the squeegee 200 to the mirror 100. While the chamber 320 and slot 325 are incorporated into the base 300 in the illustrated embodiment, a chamber and/or slot may be incorporated into other aspects of the mirror, such as the mirror frame, reservoir or elsewhere. For example, the mirror embodiment 600 of FIG. 8 shows a chamber 620 and slot 625 that are integral with the mirror frame 630 for receiving a squeegee blade 610. Other locations are possible. The base unit 300 may also comprise a shelf 330, which enables a user to conveniently place items such as razors 335, for example, and tweezers so that they are easily accessible by the user. The chamber 320 may be integral with the shelf 330 for holding the squeegee handle 210 to allow the user to position the accessory items near the squeegee 200.

Figure 5:
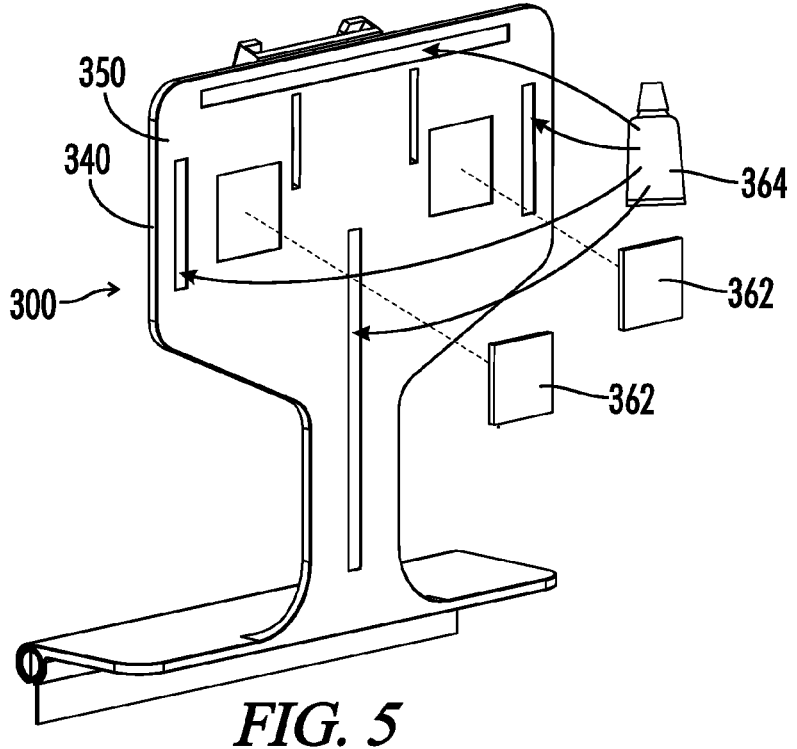
FIG. 5 illustrates one embodiment of a means for attaching the assembly to a support surface.

In one embodiment shown in FIG. 5, the base 300 further comprises an attachment section 340 having a back 350 for attachment of the base 300 to a support surface such as a wall or the like. The back 350 may be provided with suction cups (not shown, but preferable for temporary installations) or the like to enable the base 300 to be easily removable from a support surface. Alternatively, the back 350 may be provided with locations to receive permanent or semi-permanent attachment means, such as locations 361 for receiving double-sided adhesives 362, locations 363 for receiving silicone caulk 364, and the like. Silicone caulk 364, for example, adheres to many types of surfaces, is relatively easy to remove and minimizes potential damage to wall tiles or other wall surfaces, and is not likely to separate from a support surface under the influence of gravity alone.

Figure 2:
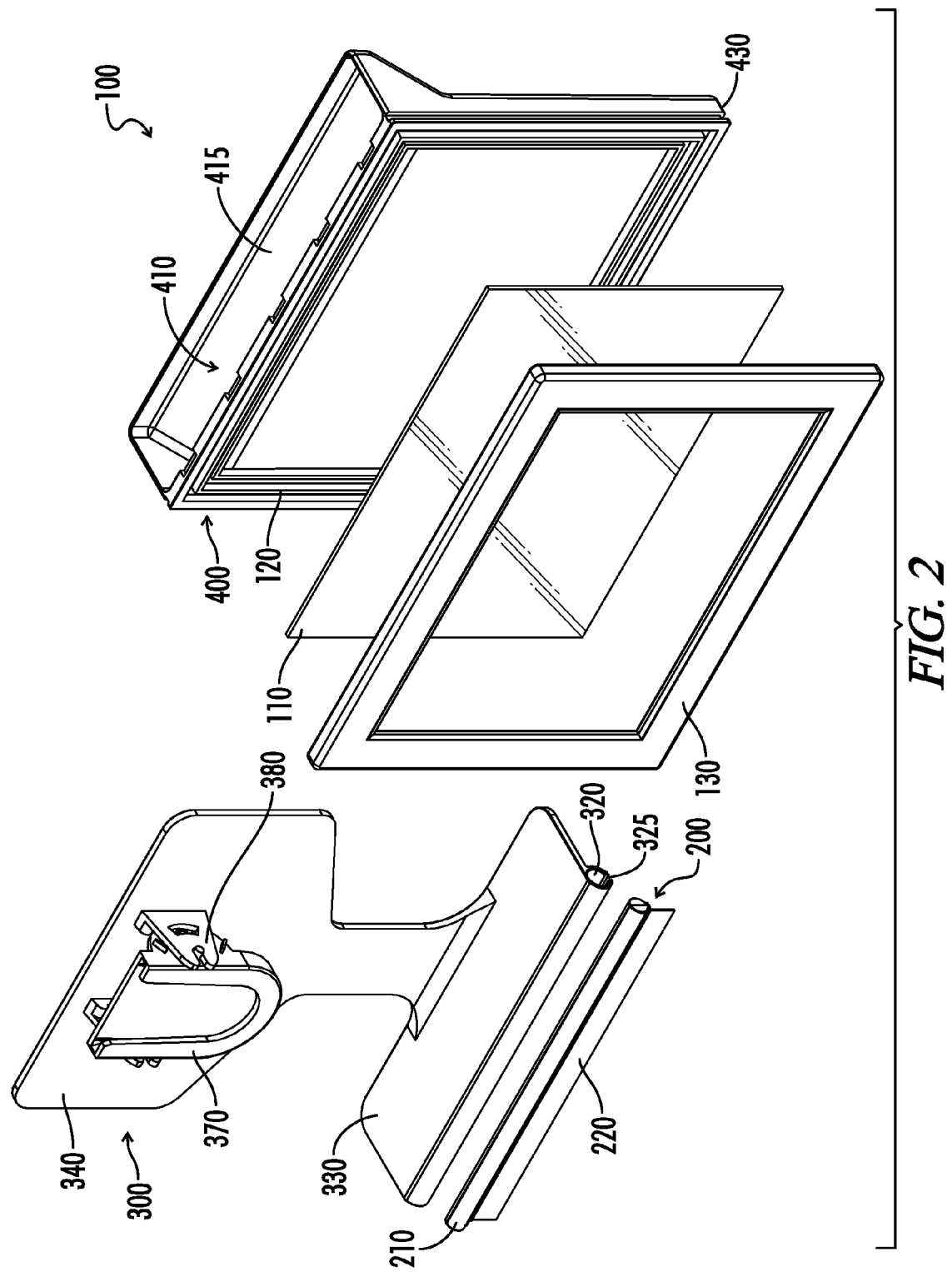
FIG. 2 is a front exploded view of the assembly of FIG. 1.
Figure 3:
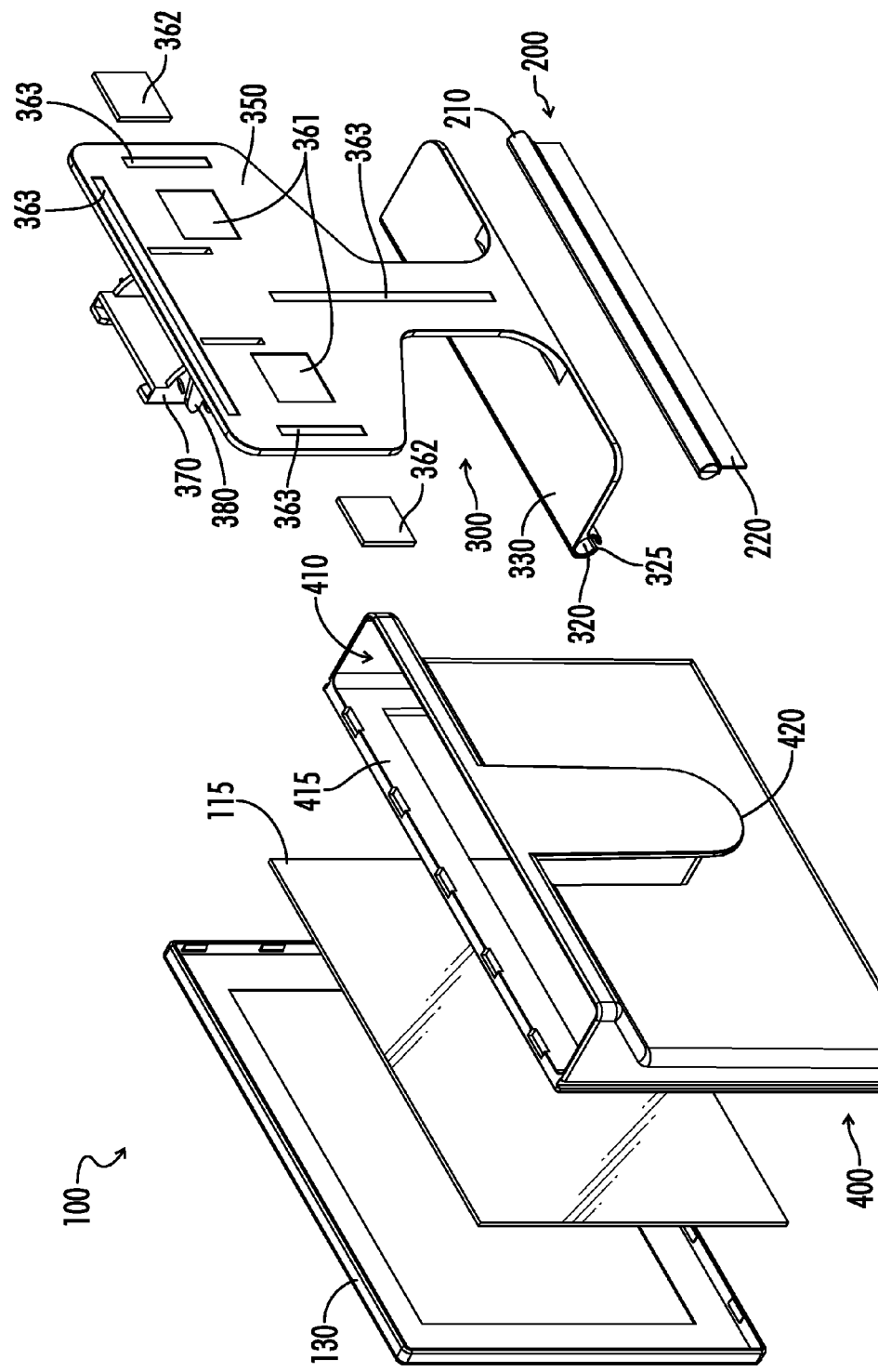
FIG. 3 is a rear exploded view of the assembly of FIG. 1.
Figures 4A, 4B, 4C:
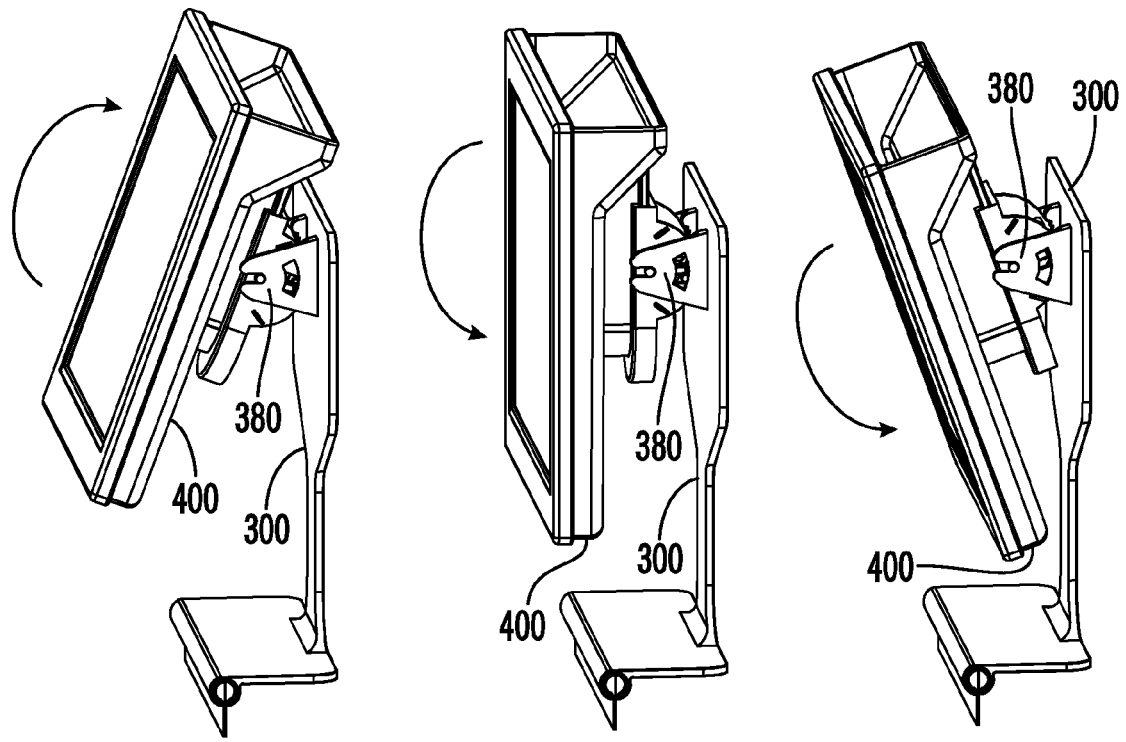
FIGS. 4A-4C illustrate one embodiment of a movement of the mirror relative to a support surface.
Figure 6:
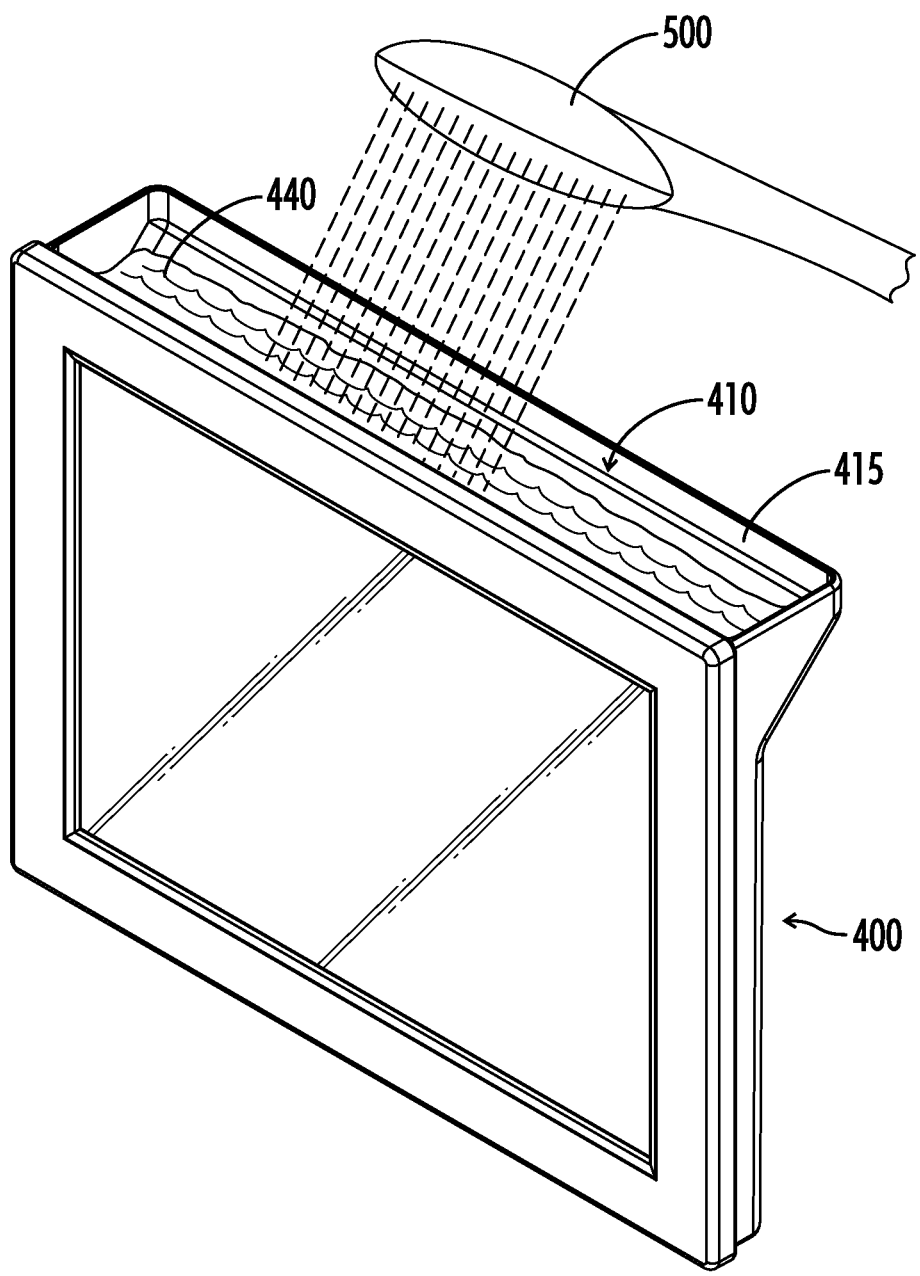
FIG. 6 illustrates the filling of the reservoir.
Figure 7:
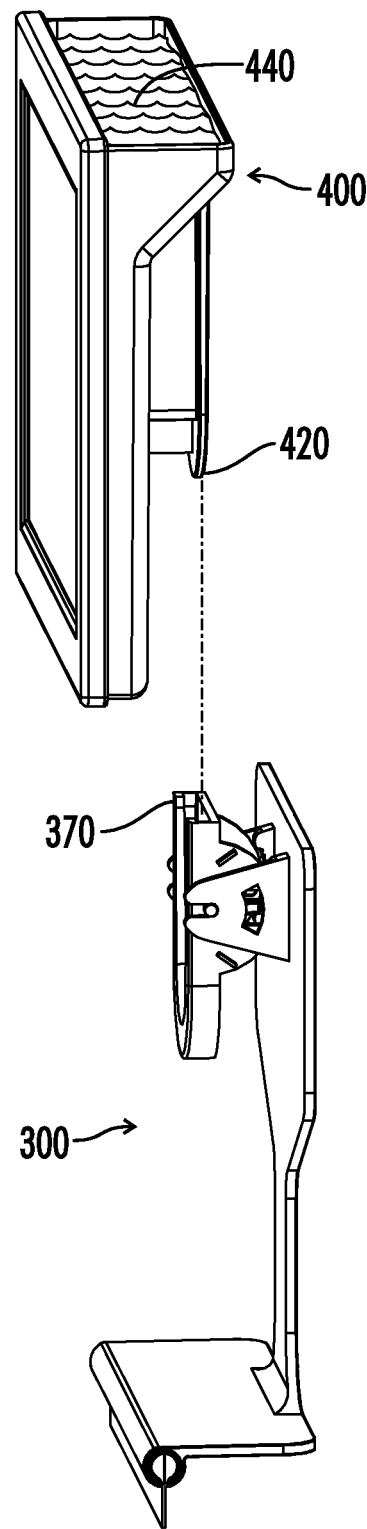
FIG. 7 illustrates attaching the mirror and filled reservoir to a support.

In one embodiment, the base 300 is integrated into the mirror assembly 100 and is integral with the mirror 110 and reservoir 400 as a single, one-piece unit. This might be preferred for a travel-size or portable assembly for use while traveling or staying in a hotel, motel or the like, or for use in college dorms, for example. In a preferred embodiment, however, the mirror 110 and reservoir 400 as a combined unit are separable from the base 300 through the engagement of a first mating member 420, such as a tongue on the reservoir 400 with a second mating member 370, such as a slot or the like on the base 300 as shown in FIGS. 2 and 3. While a tongue 420 and slot 370 are shown, other mating structures may be used. This feature enables a user to detach the mirror 110 and reservoir 400 from the base 300 so that the user can fill the reservoir chamber 410 with hot water 440 from a shower head 500, for example, as shown in FIG. 6, prior to re-engaging the mating members 420, 370 as shown in FIG. 7, and can also empty the reservoir chamber 410 after use. In a preferred embodiment, one of the mating members, and preferably the mating member 370 on the base 300 is movable for adjustable positioning of the mirror 110 relative to a user. Specifically in one embodiment, there is provided a hinge 380 between the base 300 and the second mating member 370 for pivoting the position of the mirror 110 relative to the base 300 as shown in FIGS. 4A-4C. The pivoting feature enables a user to adjust and align the mirror 110 and allows multiple users to adjust the position of the mirror 110 in accordance with height or other personal preference. The hinge 380 may allow a user to adjust the mirror 110 up or down, or side to side, or it may include a universal joint, such as a ball and socket, that allows for complete rotation around a fixed location.

Figure 9:
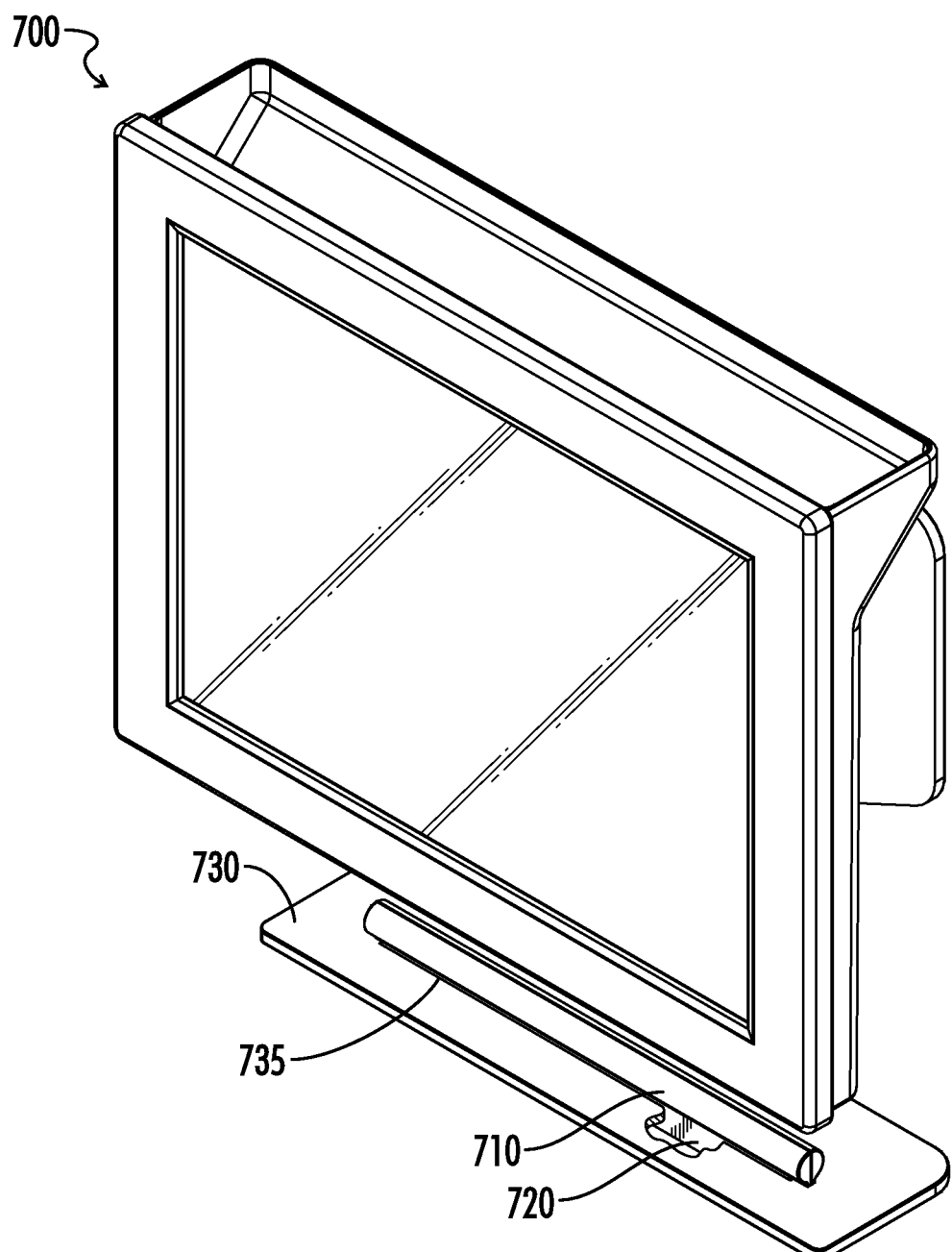
FIG. 9 illustrates an alternative embodiment of a mirror assembly.

In one embodiment, the mirror 100 is rectangular, wherein the width and length dimensions are not equal. Of course, other shapes and sizes are possible. The length of the squeegee 200 may be approximately equal to the larger side of the mirror 110 to enable the user to remove moisture from the mirror surface 110 with only one short swipe. However, if it desired to make the squeegee 200 as short as possible, the blade 220 could be the length of the shorter side of the mirror 110 and the slot 325 and/or chamber 320 could be sized to match. In this case, the user can remove moisture from the mirror 110 with one longer swipe. FIG. 9 illustrates one embodiment of a mirror assembly 700 including a shelf 730 incorporating a slot 735 for receiving a squeegee blade 720 and handle 710, where the squeegee blade 720 and handle 710 are smaller than previously discussed.

Figure 10:
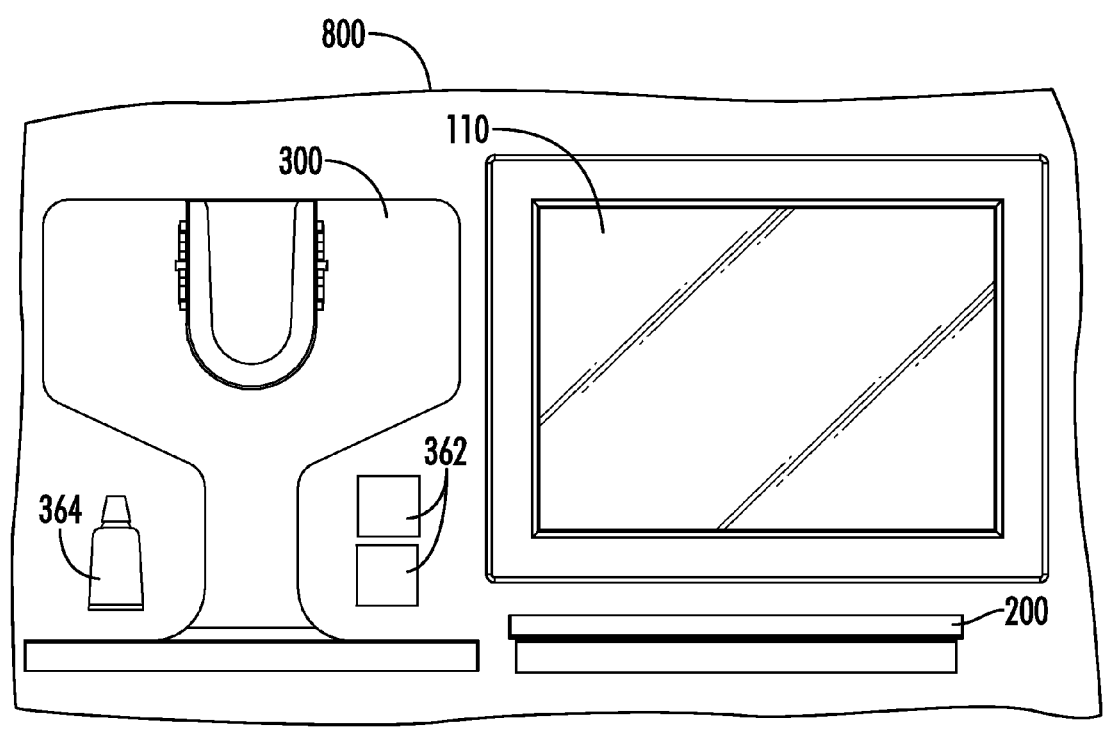
FIG. 10 illustrates one embodiment of a mirror assembly kit.

Installation and operation of the mirror 100 is relatively straightforward. In one embodiment, the mirror is sold in a kit 800 (FIG. 10), which preferably includes the mirror 110 with reservoir, base 300, squeegee 200 and mounting means 362, 364. In one embodiment, the base 300 is attached to a support surface such as a shower wall through the use of double-sided adhesives 362 and/or silicone caulk 364 or the like (FIG. 5). Thereafter, a user fills the reservoir chamber 410 with hot water 440 from the shower 500 (FIG. 6), for example, and mates the reservoir 400 with the base 300 using the mating means 370, 420 (FIG. 7) and adjusts the position of the mirror 110 with the hinge 380 (FIGS. 4A-4C). Alternatively, the user could adjust the position of the hinge 380 prior to filling the reservoir chamber 410. At this point, the mirror is ready for use and will remain fog-free for so long as the reservoir chamber 410 is filled with hot water 440. The user may then interact with accessories stored on the shelf 330, such as a razor 335, tweezers or the like, until the user is finished with the mirror or is finished taking a shower, for example, and then the user removes the reservoir 400 from the base 300 and pours out the water 440 from the chamber 410 and re-attaches the reservoir 400 and mirror 110 to the base 300. Thereafter, the user may clean the mirror 110 with the squeegee 200 and return the squeegee to the slot 325, for example, in preparation for the next use.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An assembly comprising:
   a mirror;
   a squeegee for cleaning the mirror after use, the squeegee having a handle;
   a partially enclosed chamber for retaining the handle of the squeegee and further comprising a slot in the chamber for slidably receiving the squeegee parallel to a surface of the mirror and for allowing a portion of the squeegee to pass through;
   a reservoir abutting the mirror and having a back wall, a width between the mirror and the back wall, an opening, and a floor, the opening being wider than the floor; and
   wherein a portion of the back wall is angled toward the mirror and another portion of the back wall is substantially parallel to the mirror for a portion of the reservoir; and
   wherein the majority of the reservoir has a substantially uniform width narrower than the opening.

2. The assembly of claim 1, wherein the reservoir is attached to the mirror.

3. The assembly of claim 1, further comprising a base for attaching the mirror to a support surface.

4. The assembly of claim 3, further comprising a hinge between the base and the mirror for movement of the mirror relative to the base.

5. The assembly of claim 4, wherein the base further comprises the slot for receiving the squeegee.

6. The assembly of claim 3, the base further comprising a shelf and the shelf containing the slot for receiving the squeegee.

7. The assembly of claim 1, wherein the reservoir is attached to the mirror, and further comprises a base for attaching the mirror to a support surface, the reservoir further comprises a first mating member that mates with a second mating member on the base for removable engagement of the mirror with the base.

8. The assembly of claim 7, wherein the first mating member is a tongue and the second mating member is a slot for receiving the tongue.

9. The assembly of claim 1, wherein the partially enclosed chamber has a circular cross-section along the axis.

10. A method of using a mirror having a reservoir, the mirror being removably attached to a support, the method comprising:
   a) detaching the mirror from the support;
   b) filling the reservoir;
   c) re-attaching the mirror to the support and using the mirror; and
   d) cleaning the mirror with a squeegee having a handle and stored in a slot for slidably receiving the squeegee parallel to a surface of the mirror in one of the mirror or the support, the slot comprising a partially enclosed chamber for retaining the handle;
   e) the reservoir having a back wall, a width between the mirror and the back wall, an opening, and a floor, the opening being wider than the floor, and wherein a portion of the back wall is angled toward the mirror and another portion of the back wall is substantially parallel to the mirror for a portion of the reservoir.

11. The method of claim 10, wherein the slot is in the support.

12. The method of claim 11, wherein the mirror is movable relative to the support by a hinge.

13. An assembly comprising:
   a) a mirror;
   b) a reservoir attached to the mirror, the reservoir having a back wall, a width between the mirror and the back wall, an opening, and a floor, the opening being wider than the floor, and wherein a portion of the back wall is angled toward the mirror and another portion of the back wall is substantially parallel to the mirror for a portion of the reservoir;
   c) a support for removably receiving the mirror;
   d) a hinge defined between the mirror and support for adjusting the mirror relative to the support when the mirror is received in the support; and
   e) a squeegee for cleaning the mirror, the squeegee having a handle and being stored in a slot for slidably receiving the squeegee parallel to a surface of the mirror in one of the support or the mirror, the slot further comprising a chamber for retaining the handle.

14. The assembly of claim 13, the support further comprising the slot for storing the squeegee.

15. The assembly of claim 13, the mirror further comprising the slot for storing the squeegee, and wherein the slot receives the squeegee along an axis of the slot.

16. A kit comprising:
   a) a mirror;
   b) a reservoir associated with the mirror and having a back wall, a width between the mirror and the back wall, an opening, and a floor, the opening being wider than the floor, and wherein a portion of the back wall is angled toward the mirror and another portion of the back wall is substantially parallel to the mirror for a portion of the reservoir;
   c) a support for receiving the mirror;
   d) a squeegee for cleaning the mirror stored in a slot for slidably receiving the squeegee in one of the support or the mirror parallel to a surface of the mirror, the slot further comprising a partially enclosed chamber for retaining a handle of the squeegee; and
   e) means for attaching the support to a support surface.

17. The kit of claim 16, the attaching means further comprising adhesive material.

18. The kit of claim 17, the attaching means further comprising silicone.

19. The kit of claim 16, the support including the slot for storing the squeegee.

* * * * *